L. H. HARLOW.
HEAT REGULATOR.
APPLICATION FILED DEC. 20, 1916.
1,239,594.
Patented Sept. 11, 1917.
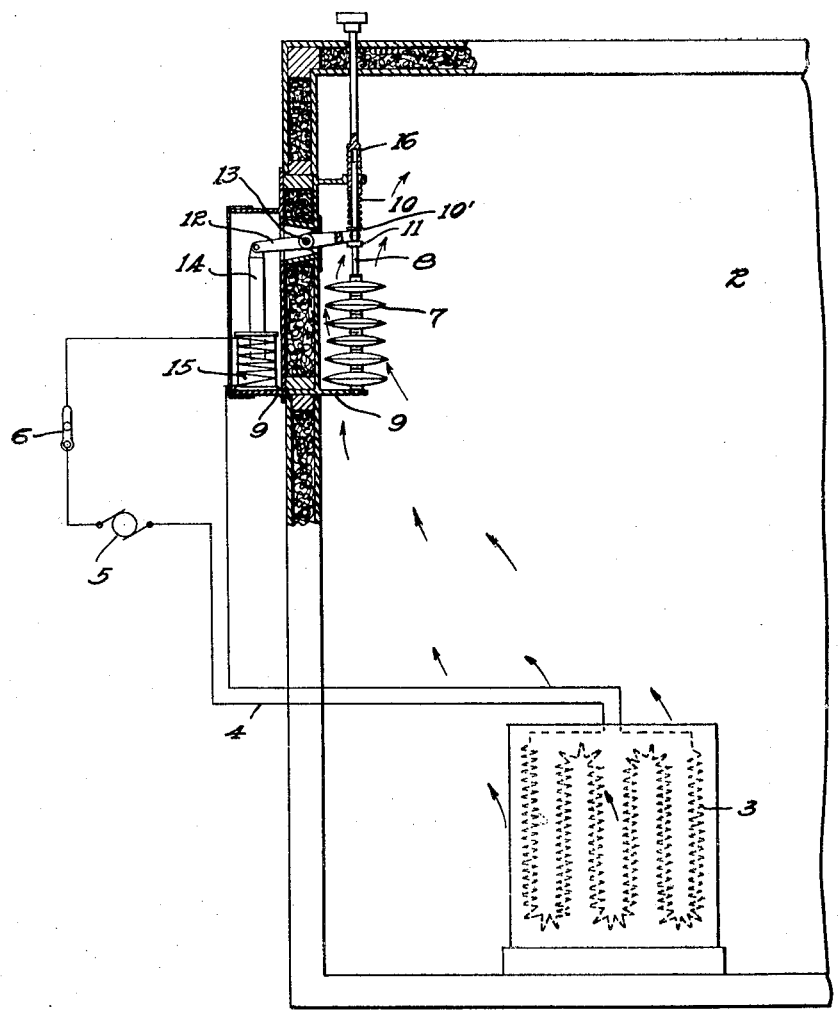
WITNESSES
INVENTOR
LEE H. HARLOW
BY
ATTORNEYS

UNITED STATES PATENT OFFICE.

LEE H. HARLOW, OF GALESBURG, ILLINOIS, ASSIGNOR TO MINNEAPOLIS HEAT REGULATOR COMPANY, OF MINNEAPOLIS, MINNESOTA, A CORPORATION.

HEAT-REGULATOR.

1,239,594.  Specification of Letters Patent.  Patented Sept. 11, 1917.

Application filed December 20, 1916. Serial No. 138,135.

*To all whom it may concern:*

Be it known that I, LEE H. HARLOW, a citizen of the United States, resident of Galesburg, county of Knox, State of Illinois, have invented certain new and useful Improvements in Heat-Regulators, of which the following is a specification.

The object of this invention is to provide a thermostatic heat regulating device by means of which an alternating electric current may be used, taken directly from the surface wires, thereby eliminating batteries, springs, weights and sliding contacts usually found in devices of this kind.

The invention consists generally in various constructions and combinations, all as hereinafter described and particularly pointed out in the claims.

In the accompanying drawings forming part of this specification,

The figure is a view, partially in section, illustrating the application of my invention to an incubator or other apparatus in which it is desired to maintain a uniform temperature.

In the drawing, 2 represents the incubating chamber, in which a resistance coil 3 is mounted and connected with an alternating current circuit 4 having the usual generator 5 and a controlling switch 6. The thermostatic device I mount in the wall of the incubator. The thermostat itself consists of a series of hollow disk 7 filled with a volatile fluid, such as alcohol, which will expand and contract under varying degrees of temperature. The disks are arranged one above the other, and joined together by suitable means, and the lower one has a bearing in a frame 9 that is mounted in the wall of the incubator or other apparatus in which the heat is to be controlled. A rod 8 is connected to the upper disk and projects upwardly therefrom and is provided with a spring 10 mounted to bear on a washer 10' and a shoulder 11 is interposed between said spring and the disks 7 for the purpose of transmitting the expansion of the disks to said spring, which normally resists upward movement of the disks. This movement will take place when the liquid in the hollow disks is subjected to a rising temperature, the disks being composed of thin material which will expand under pressure of the fluid and transmit their movement to the rod 8 and the spring 10.

A lever 12 is pivoted at 13 in the wall of the incubator and projects therethrough and has its outer end connected with the armature 14 of a solenoid or reactance coil 15 which is mounted in the frame 9 on the outside of the incubator. This coil is in the alternating circuit 4. An adjusting device 16 is provided on the rod 8 and by means of which the tension of the spring 10 can be increased or decreased to vary its resistance to the movement of the thermostatic disks. The movement of the armature 14 with respect to the coil will have the effect of varying the voltage of the current, increasing it as the armature is withdrawn and decreasing it as the armature is moved into the coil. The effect of this is to vary the intensity of the current in resistance 3. When the thermostatic disks expand under the rising temperature of the incubator, the voltage will be reduced and less heat thrown off by the resistance coil. On the other hand, when the temperature in the chamber falls, the thermostatic disk will contract, withdrawing the armature of the reactance coil and increasing the voltage in the alternating current circuit and causing more heat to be thrown out into the incubating chamber from the coils of the resistance. In this way the temperature of the incubating chamber or other place where the device may be located can be easily and accurately controlled.

I have shown and described the device used in connection with an incubating chamber, but it will be understood that I do not confine myself to such use, as the apparatus may be employed in regulation of bake ovens, kilns, and the like or wherever a current of this kind may be utilized for heating purposes.

I claim as my invention:

1. A heating system comprising a heating element, an alternating electric circuit therefor, a reactance coil in said circuit, and a thermostatic device connected with said coil for varying the voltage therethrough and thereby regulating the heat thrown off by said element proportionately to the temperature of the space where said thermostatic device is located.

2. The combination, with a resistance coil and an alternating electric circuit connected therewith, of a reactance coil in said circuit, an armature therefor, a thermostatic device having means for expansion or contraction with the varying temperature, means connecting said thermostatic device with said armature for varying the voltage in said reactance coil and said resistance coil proportionately to the variation in temperature of the place where said thermostatic device is located.

In witness whereof, I have hereunto set my hand this 18th day of October, 1916.

LEE H. HARLOW.

Witness:
H. A. ANDERSON.